US008706083B2

(12) United States Patent
Willis

(10) Patent No.: US 8,706,083 B2
(45) Date of Patent: Apr. 22, 2014

(54) BLUETOOTH AUTHENTICATION SYSTEM AND METHOD

(75) Inventor: Nicholas Hedley Willis, Remuera (NZ)

(73) Assignee: Eckey Corporation, Wilmington, DE (US)

( * ) Notice: Subject to any disclaimer, the term of this patent is extended or adjusted under 35 U.S.C. 154(b) by 0 days.

(21) Appl. No.: 13/143,698

(22) PCT Filed: Jan. 7, 2010

(86) PCT No.: PCT/NZ2010/000002
§ 371 (c)(1),
(2), (4) Date: Jan. 3, 2012

(87) PCT Pub. No.: WO2010/090533
PCT Pub. Date: Aug. 12, 2010

(65) Prior Publication Data
US 2012/0108208 A1   May 3, 2012

(30) Foreign Application Priority Data
Jan. 7, 2009   (NZ) ......................................... 574088

(51) Int. Cl.
*H04M 1/66* (2006.01)
(52) U.S. Cl.
USPC ........................................ 455/411; 455/41.2
(58) Field of Classification Search
USPC ................................ 455/41.2, 411
See application file for complete search history.

(56) References Cited

U.S. PATENT DOCUMENTS

| | | |
|---|---|---|
| 4,534,194 A | 8/1985 | Aydin |
| 5,692,019 A | 11/1997 | Chang et al. |
| 6,052,598 A | 4/2000 | Rudrapatna et al. |
| 6,055,321 A | 4/2000 | Numao et al. |
| 6,091,808 A | 7/2000 | Wood et al. |
| 6,564,056 B1 | 5/2003 | Fitzgerald |
| 6,622,912 B2 | 9/2003 | Tejedor Ruiz |
| 6,785,272 B1 | 8/2004 | Sugihara |
| 6,985,695 B1 | 1/2006 | Kato |
| 6,985,697 B2 | 1/2006 | Smith et al. |
| 7,031,660 B2 | 4/2006 | Vonheim et al. |
| 7,158,756 B2 | 1/2007 | Palin et al. |

(Continued)

FOREIGN PATENT DOCUMENTS

| | | |
|---|---|---|
| EP | 1612999 | 1/2006 |
| KR | 10-2005-0040644 A | 5/2005 |

(Continued)

OTHER PUBLICATIONS

PCT International Search Report and Written Opinion on application No. PCT/NZ2010/000002 dated Jul. 30, 2010; 13 pages.

(Continued)

*Primary Examiner* — Barry Taylor
(74) *Attorney, Agent, or Firm* — Iandiorio Teska & Coleman, LLP

(57) ABSTRACT

A method of controlling an authorization device arranged to authorize a mobile communication device, the method including the steps of: a central control device generating a control parameter associated with the one or more authorization devices, the central control device communicating the control parameter to the one or more authorization devices, the central control device generating a Bluetooth compatible PIN based on the control parameter, and the central control device communicating the PIN to a mobile communication device.

13 Claims, 3 Drawing Sheets

(56) References Cited

U.S. PATENT DOCUMENTS

| | | |
|---|---|---|
| 7,360,248 B1 | 4/2008 | Kanevsky et al. |
| 7,856,209 B1 | 12/2010 | Rawat |
| 2002/0059238 A1 | 5/2002 | Saito |
| 2003/0117293 A1 | 6/2003 | Tang et al. |
| 2004/0114779 A1 | 6/2004 | Blazey |
| 2004/0169589 A1 | 9/2004 | Lea et al. |
| 2004/0235455 A1* | 11/2004 | Jiang ............................ 455/411 |
| 2005/0027982 A1 | 2/2005 | Haparnas et al. |
| 2005/0044906 A1 | 3/2005 | Spielman |
| 2005/0242921 A1 | 11/2005 | Zimmerman et al. |
| 2005/0254652 A1 | 11/2005 | Engler et al. |
| 2006/0068760 A1 | 3/2006 | Hameed et al. |
| 2006/0128305 A1 | 6/2006 | Delalat |
| 2006/0135065 A1* | 6/2006 | Lee et al. .................... 455/41.1 |
| 2007/0200665 A1 | 8/2007 | Studerus |
| 2008/0066080 A1* | 3/2008 | Campbell ..................... 719/314 |
| 2008/0279158 A1* | 11/2008 | Schmidt et al. ............... 370/338 |
| 2008/0294778 A1* | 11/2008 | Wang et al. ................... 709/226 |
| 2009/0100530 A1* | 4/2009 | Chen .............................. 726/29 |
| 2009/0156126 A1 | 6/2009 | Willis |
| 2011/0001603 A1 | 1/2011 | Willis |

FOREIGN PATENT DOCUMENTS

| | | |
|---|---|---|
| WO | WO 01/58098 A2 | 8/2001 |
| WO | WO 01/63425 A1 | 8/2001 |
| WO | WO 02/095689 A1 | 11/2002 |
| WO | WO 2005/107094 | 11/2005 |
| WO | WO 2006/098690 A1 | 9/2006 |
| WO | WO 2007/114716 A1 | 10/2007 |
| WO | WO 2008/070886 A2 | 6/2008 |
| WO | WO 2009/075589 A2 | 6/2009 |

OTHER PUBLICATIONS

Written Opinion of the International Searching Authority for International Application No. PCT/NZ2008/000319, mailed May 7, 2010 (six (6) pages).

Written Opinion of the International Searching Authority for International Application No. PCT/NZ2007/00069, mailed Jul. 31, 2007 (three (3) pages).

Puech et al., "A New Crypto-Watermarking Method for Medical Images Safe Transfer", Proc. 12$^{th}$ European Signal Processing Conference (EUSIPCO '04), pp. 1481-1484, Vienna, Austria, Sep. 2004 (four (4) pages).

Hellebrandt et al., Estimating Position and Velocity of Mobiles in a Cellular Radio Network, IEEE Transactions on Vehicular Technology, vol. 46, No. 1, Feb. 1997, pp. 65-71.

* cited by examiner

US 8,706,083 B2

BLUETOOTH AUTHENTICATION SYSTEM AND METHOD

CROSS-REFERENCE TO RELATED PATENT APPLICATIONS

This application is a US national phase application of PCT application no. PCT/NZ/2010/000002 filed Jan. 7, 2010 which claims priority from New Zealand Application NZ 574088, filed Jan. 7, 2009. All of the aforesaid applications are incorporated herein by reference in their entirety as if fully set forth herein

FIELD OF THE INVENTION

The present invention relates to a Bluetooth authentication system and method. In particular, the present invention relates to a method of controlling an authorisation device, a central control device for controlling authorisation using an authorisation device and a mobile communication device, a method of authorising a mobile communication device using an authorisation device, and an authorisation device for authorising a mobile communication device.

BACKGROUND

Bluetooth pairing is a simple authentication method that is used by mobile communication devices, such as a mobile (cell) telephones, PDAs and the like. It is a relatively easy to use system that enables two Bluetooth compatible devices to communicate with each other in a local space.

In order to communicate, the two devices are required to link together by way of a Bluetooth pairing mechanism. That is, an authentication request is sent by a first device. This authentication request is based on a PIN set by the user of the first device. The first user also tells the second user the PIN that was used.

An authentication response is returned by the second device using the same PIN. Therefore, the authentication response returned by the second device is based on the same PIN and so the connection is authenticated and established.

Once established a 128 bit link key is used to avoid the need to enter the PIN each time the two devices wish to communicate with each other.

However, as the PIN is fixed, once one person knows the PIN they can share it with others and anyone is then able to gain access. Also, to change the PIN every time requires an authorised user to enter the PIN to validate a user. That is, an administrator who wishes to authorise a user to access a site using a specific Bluetooth access device provides the user with a PIN which allows them to pair their Bluetooth device with the Bluetooth access device. However, the administrator then needs to provide a new PIN at the access device each time a new user requires access.

PCT application WO 02/095689 describes a security system that includes a central controller, mobile device and access device. The central controller transmits the same authorisation code to both the mobile device and access device. When the mobile device requests access through the access device, the access device forwards an authentication challenge that includes a randomly generated number that is not known by the mobile device. The mobile device uses a portion of the authentication challenge in combination with the authorisation code to create a response. This static response is compared with the expected response by the access device, and access is provided if they are the same. However, this system sends and uses the same static authorisation code for both the mobile device and access device. Further, the system requires the mobile device to be fitted with specific technology that enables it to generate the required response.

U.S. Pat. No. 7,360,248 describes a system that compares the location of a user using their GPS device with the location of the access device to determine if they correspond, and so make the determination of whether to allow access. However, the system does not utilise a Bluetooth compatible PIN to verify the user.

The present invention aims to overcome, or at least alleviate, some or all of the afore-mentioned problems, or to at least provide the public with a useful choice.

SUMMARY OF THE INVENTION

According to one aspect, the present invention provides a method of controlling an authorisation device arranged to authorise a mobile communication device using a dynamically generated Bluetooth compatible PIN, the method including the steps of: a central control device generating a control parameter associated with the one or more authorisation devices, the central control device communicating the control parameter to the one or more authorisation devices, the central control device generating a Bluetooth compatible PIN based on the control parameter, and the central control device communicating the PIN to a mobile communication device.

According to a further aspect, the present invention provides a method of authorising a mobile communication device using an authorisation device, the method including the steps of: the authorisation device discovering a mobile communication device using Bluetooth, the authorisation device forwarding a Bluetooth connection authentication request to the mobile communication device, the authorisation device receiving a Bluetooth authentication response based on a PIN entered on the mobile communication device in response to the authentication request, the authorisation device dynamically generating a Bluetooth matching response based on a PIN-generated from control parameter, the authorisation device determining whether the received Bluetooth authentication response is identical to the Bluetooth matching response and authorising based upon the determination.

According to yet a further aspect, the present invention provides a central control device for controlling authorisation using an authorisation device and a mobile communication device using a dynamically generated Bluetooth compatible PIN, the central control device including a control parameter generating module, a communication module and a PIN generating module, wherein: the control parameter generating module is arranged to generate a control parameter, the control parameter being associated with the one or more authorisation devices, the PIN generating module is arranged to generate a Bluetooth compatible PIN based on the control parameter, and the communication module is arranged to communicate the control parameter to the one or more authorisation devices and communicate the PIN to a mobile communication device.

According to yet a further aspect, the present invention provides an authorisation device for authorising a mobile communication device, the authorisation device including a communication module, response module and control module: the communication module arranged to discover a mobile communication device using Bluetooth, forward a Bluetooth connection authentication request to the mobile communication device, and receive a Bluetooth authentication response based on a PIN entered on the mobile communication device in response to the authentication request, the response module arranged to dynamically generate a Bluetooth matching response based on a PIN generated from a control parameter, and the control module arranged to determine whether the received Bluetooth authentication response is identical to the Bluetooth matching response and authorising authorise based upon the determination.

BRIEF DESCRIPTION OF THE DRAWINGS

Embodiments of the present invention will now be described, by way of example only, with reference to the accompanying drawings, in which.

DETAILED DESCRIPTION OF THE INVENTION

First Embodiment

Figure 1:
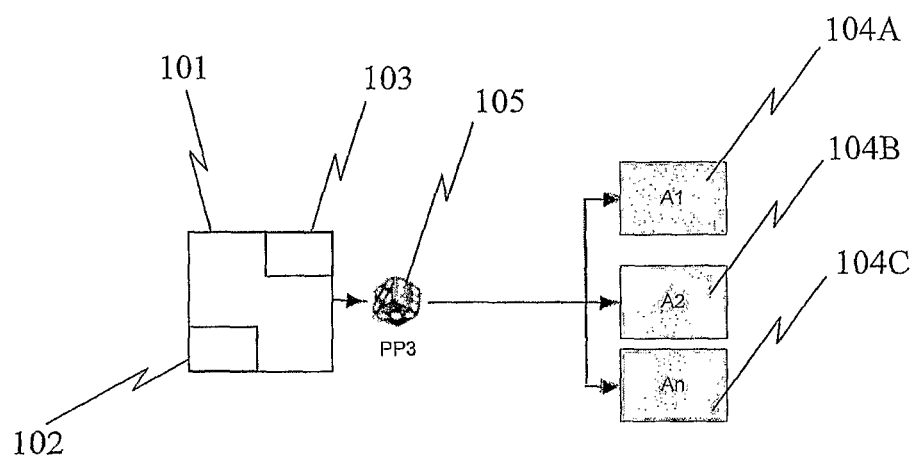
FIG. 1 shows a system block diagram of an authorisation system according to an embodiment of the present invention.

FIG. 1 shows a system block diagram of an authorisation system. The system includes a central control device in the form of a management system 101. The central control device includes a control parameter generating module 102 and a communication module 103.

The control parameter generating module generates a control parameter 105 for use by authorisation devices 104A, 104B, 104C etc. It will be understood that there may be one or more readers or authorisation devices 104.

The control parameter 105 is generated at the central control device and then forwarded or communicated to one or more specific authorisation devices. Groups of authorisation devices may receive the same control parameter or different control parameters. The control parameter 105 is produced using a pre-defined code (for example a number) that is uniquely associated with the authorisation device or groups of authorisation devices. The code may be randomly generated, or produced using any other suitable method.

The communication module 103 of the central control device 101 in this embodiment is a wireless GSM communication module that is arranged to communicate with a mutually compatible communication module in the authorisation devices over the telecommunications GSM network using the known protocols.

It will be understood that, as an alternative, any other suitable form of wireless data communication connections may also be implemented, such as, for example, a Bluetooth connection, a Wi-Fi connection, any form of radio frequency connection, etc.

Alternatively, the communication module 103 in the central control device may be arranged to communicate with the communication module(s) in authorisation device(s) over a wired communication link, for example, by using known protocols in the form of an Internet protocol connection, a serial bus connection, or a universal serial bus connection, for example.

In this embodiment, the authorisation devices are access devices that allow a user to access a secure area upon a positive authorisation. The authorisation devices are located at specific points where it is required to authorise a user prior to allowing them access to the secure area.

However, it will be understood that the present invention is not limited to any specific process after authorisation, and that the authorisation devices may be used for any other post-authorisation process. For example, the process may be of the form whereby, upon authentication, data is transmitted, an event is triggered, a door is opened, and an event is logged in an audit trail or may be of any other suitable form. The authorisation devices enable the authentication of a user, which then allows the authorisation device to perform a further act or provide an output upon that authorisation.

Figure 2:
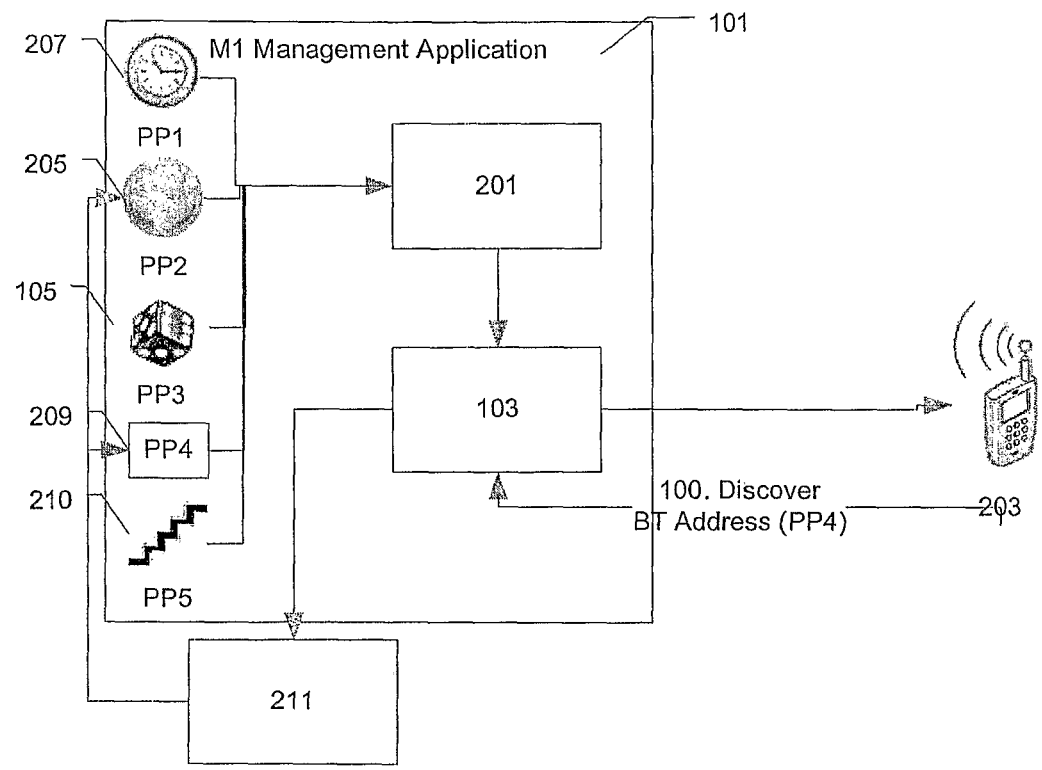
FIG. 2 shows a further system block diagram of an authorisation system according to an embodiment of the present invention.

FIG. 2 shows the authorisation system at the next stage of authentication. The central control device 101 is shown to have a PIN generating module 201. The PIN generated by this module is a Bluetooth compatible PIN for use when discovering Bluetooth communication devices. The PIN generating module 201 generates a PIN for use on a mobile communication device 203, such as a mobile telephone or cell device for example. The PIN, once generated by the PIN generating module, is communicated to the mobile communication device using the communication module 103. In this embodiment, the communication module forwards the PIN to the mobile communication device by SMS.

It will be understood that the PIN may be forwarded to the mobile communication device by any other suitable means. For example, the PIN may be forwarded by displaying the PIN on a page accessed via the Internet where the page is only accessible using suitable login details specific to the user. Alternatively, the PIN may be transmitted via an e-mail message to the user, by voice message, or in a written communication via a postal delivery service, for example.

The PIN generating module 201 generates a PIN based on a number of different parameters. The first parameter is the control parameter 105 that is sent to the authorisation devices.

A second parameter 205 is based on location information for the authorisation device(s) or groups of devices. For example, the location information may be the GPS co-ordinates of the location of the authorisation device. In this embodiment, the location information is retrieved from a database store where each location is associated with a specific authorisation device or group of authorisation devices. As an alternative, the system may request the latest location information from the authorisation device to ensure that any recent changes in the location of the authorisation device do not affect the ability to enable the authorisation device to correctly authenticate the required users. This is particularly useful where the authorisation devices are not always in a fixed location.

The third parameter 207 is based on temporal information associated with when a user is able to gain authentication. For example, the temporal information may be the time, day or date when it has been determined the user is able to gain authentication.

The fourth parameter 209 is based on the Bluetooth address of the mobile communication device 203 that will be used to gain authentication, as will be explained later. In this embodiment, the Bluetooth address of the mobile communication device is retrieved from a database 211 that is used to store the parameters discussed above. That is, the administrator of the system has a database record of all Bluetooth addresses of all mobile communication devices for users of the system. Alternatively, the Bluetooth address of the mobile communication device 203 may also be retrieved directly from the mobile communication device via the communication module 103, for example, via Bluetooth discovery, prior to generating the PIN.

The fifth parameter 210 is the required level of privileges that will be assigned to a successful authentication. Different levels of privileges may require different PIN to be used.

The control parameter may be one or a combination of temporal parameters (for example from a clock), spatial parameters (for example from a Global Positioning System), specific the address of the mobile communication device (for example Bluetooth address) and secret key.

The PIN generating module may therefore generate a PIN that is unique based on one or more of the time of the request, the location of the request, the mobile communication device making the requested and private information.

The PIN required for the authorisation device can be distributed to a mobile communication device and can be distributed unencrypted (for example email or text message) without any significant loss of security. This is because the PIN is only valid on the authorisation device for the specific combination of control parameters from which it was generated. The system allows requests for the PIN to be made with an alternative set of unique identifiers, such as the mobile phone number through a text message request or proximity card number through a proximity reader, and if that alternative identifier is allowed the PIN can be sent to the mobile communications device.

In this embodiment, all of the parameters, the code, the location information, the temporal information and the Bluetooth address are used as data inputs to a cryptographic hash function (for example MD5 or SHA) to generate a hash value (such as a 128 bits value) from which a Bluetooth compatible PIN can be obtained (for example the first four numerals), which is then communicated to the mobile communication device via the communication module 103.

Figure 3:
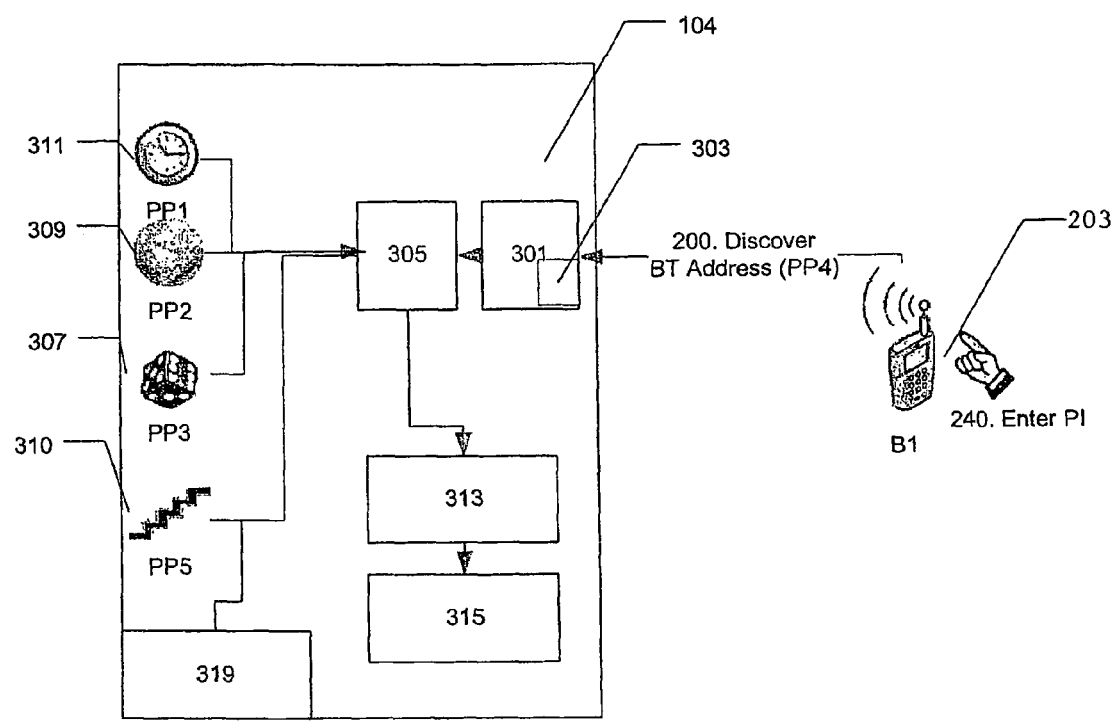
FIG. 3 shows a further system block diagram of an authorisation system according to an embodiment of the present invention.

Referring to FIG. 3, the authentication or authorisation method using the system will now be described. The authorisation device 104 includes a communication module, which also includes a Bluetooth address reading module 303. Also included are a response module 305, a control parameter storage module 307 for storing the control parameter received from the central control device 101, a location determination module 309 for determining the current location of the authorisation device, a temporal information determination module 311 for determining the current time, day or date, a control module 313 and an authorisation output module 315. Further, optionally an external input device 319 may be provided to detect an external input and forward that detection to the response module 305.

When a user approaches the authorisation device with a Bluetooth enabled mobile communication device 203. The communication module 301 on the authorisation device detects (or discovers) the mobile communication device 203 and initiates a Bluetooth connection sequence.

The authorisation device forwards a Bluetooth connection authentication request to the mobile communication device. The mobile communication device returns a Bluetooth authentication response back to the authorisation device in the form of a PIN entered on the keyboard of the mobile communication device. The PIN entered by the user should be the same PIN that was previously forwarded to the user by the central control device 101.

As part of the communication sequence, the Bluetooth address of the mobile communication device 203 is also transmitted to the Bluetooth address reading module 303 of the authorisation device. The Bluetooth address of the mobile communication device 203 is communicated to the response module. Also communicated to the response module are the control parameter 105, which is stored in the control parameter storage module 307, the current location of the authorisation device in terms of GPS co-ordinates as determined by the location determination module 309 and the current time, day or date (or any combination thereof) received from the temporal information determination module 311. The level of privileges 310 can be affected by using the external input device 319. The signal received from the external input device may also be used in the response module 305.

Upon receiving these five parameters the response module 305 dynamically generates a Bluetooth matching response in the form of a suitable Bluetooth compatible PIN. The PIN is dynamically generated based on the five parameters.

The level of privileges based on those parameters can also be determined. For example the external input device 319 could determine if the authorisation device finds the mobile communications device or if the mobile communications device finds the authorisation. Alternatively the external input device 319 could detect a button press on the authorisation device. Different privileges may also relate to an authentication process in the authorisation output module 315

For example, there may be two access privileges, one for guests and one for property managers. Property managers may have the privileges that allow them to administer the unit while the privileges assigned to guests do not allow them to administer the unit. Both forms of privileges require pairing to be set up and both have different PINs. In Bluetooth the PIN is never transmitted over the air and can not be used by the reader to distinguish between whether it is a guest or a manager that is trying to pair. The external input lets the system know whether it is a guest or a manager trying to pair. Therefore, the external input device provides the information in advance as to whether a guest or a manager is being paired to the device. The external input device may be a switch, button or key switch etc.

The step of dynamically generating a Bluetooth matching response includes the steps of: the authorisation device dynamically generating a Bluetooth pairing PIN based on the control parameter. The authorisation device then dynamically generates an internal Bluetooth authentication matching response based on the dynamically generated Bluetooth pairing PIN.

The authorisation device has thus received the Bluetooth authentication response from the mobile communication device as well as determining the internally dynamically generated Bluetooth matching response based on the five parameters. These two responses are forwarded to the control module 313 where it is determined if the responses are identical. If the authentication and matching responses are identical, then the user is authenticated or authorised.

The control module 313 outputs a control signal to the authorisation output module 315 to produce the desired authentication output. In this embodiment the output is that of unlocking a secure area to which the user has been granted access.

Therefore, the system can be set up to allow users to be authorised by one or more authorisation devices or groups of authorisation devices based on a number of factors. For example, a user may only be authorised at certain times or periods of the day or night, on certain days, or certain months. The system may also be set up to positively refuse access at certain specific times or periods as opposed to positively authenticating at certain times or periods. The time periods may be re-occurring or a single occurrence time period.

Also, the user may only be given authorisation for specific single or groups of authorisation devices. Also, the user may only be authorised when their location matches that of the location of the authorisation device being communicated with. Further, only certain mobile communication devices may be used for authorisation purposes.

A number of advantages are provided by embodiments of the present invention. In particular, a keyless authorisation device is provided which results in a device that can be more robust and more secure. Further, a separate PIN is not required each time a mobile communication device requires authorisation with a particular authorisation device, but the PINs are specific to a reader or group of readers.

Also, the level of security can easily be increased by using further parameters to dynamically create the PIN, such as time, geography, Bluetooth address, length of PIN etc.

Different privileges can be associated with different authorisation behaviours such as the following.

The control parameter could be changed regularly at certain intervals to ensure that previous users provided with PINs are not able to gain access at later times.

Further options include allowing the authorisation device to authorise the mobile communication device so that the authorisation remains valid for a predefined number of authorisation attempts. Further, the authorisation device may request a further authorisation after the predefined number of authorisation attempts have been made.

Also, upon the authorisation device authorising the mobile communication device, the authorisation may remain valid for a predefined temporal period. Further, the authorisation device may request further authorisation after the predefined temporal period has expired.

Also, upon the authorisation device authorising the mobile communication device, the authorisation may remain valid until manually de-authorised. Further, the manual de-authorisation may be by way of a third party in control of the authorisation device or the user of the mobile communication device.

The authorisation device may also record all authorisation event information in a storage module. The event information may be transmitted via a wired or wireless data connection as described herein upon receiving a third party request via a wired or wireless data connection. The third party may be an administrator, for example.

Also, requests for the PIN can be made from a parallel authentication system such as the mobile phone number (MSISDN) through a text message request or proximity card number through a proximity reader, or login into a website or a purchase process. If that parallel authentication process is successful the appropriate PIN for the appropriate privileges can be sent to the mobile communications device.

Further Embodiments

It will be understood that the embodiments of the present invention described herein are by way of example only, and that various changes and modifications may be made without departing from the scope of invention.

Although the above described embodiment uses five separate parameters to dynamically generate the PIN at the central control device to be transmitted to the mobile communication device and to generate the matching response at the authorisation device, it will be understood that as a minimum, only the control parameter is required. Optionally, one or more of the temporal parameters may be used to generate the PIN. These parameters, temporal, location and Bluetooth address, are optional parameters that provide an increased level of security and control. That is, an administrator can select which of the optional parameters are required and select to use these if they desire.

The invention claimed is:

1. A method of controlling an authorization device configured to authenticate a mobile communication device, the method comprising:
    dynamically generating a mobile device pin for the mobile communication device calculated based on one or more parameters;
    forwarding an authentication request from the authorization device to the mobile communication device;
    sending the dynamically generated mobile device pin from the mobile communication device to the authorization device;
    in response, dynamically generating an authorization device matching pin calculated based on the same one or more parameters used to dynamically generate the mobile device pin;
    determining if the dynamically generated authorization device matching pin is the same as the dynamically generated mobile device pin and, if so, pairing the mobile communication device to the authorization device; and
    upon pairing the mobile communication device to the authorization device, outputting an access control signal from the authorization device.

2. The method of claim 1 in which dynamically generating a mobile device pin for the mobile communication device includes wirelessly transmitting said dynamically generated mobile device pin to the mobile device.

3. The method of claim 2 in which wirelessly transmitting said dynamically generated mobile device pin to the mobile device includes one or more of an SMS, interne page, e-mail message, voice message, and postal delivery.

4. The method of claim 1 in which sending the dynamically generated mobile device pin from the mobile communication device to the authorization device includes entering the dynamically generated mobile device pin on a keyboard of the mobile communication device.

5. The method of claim 1 in which pairing the mobile communication device to the authorization device includes Bluetooth pairing of the authorization device to the mobile communication device.

6. The method of claim 1 in which outputting the access control signal from the authorization device includes controlling a lock.

7. The method of claim 1 in which said one or more parameters include a control parameter, a location information parameter, a temporal parameter, and/or the Bluetooth address of the mobile communication device.

8. An authorization device unlocking system comprising:
    a mobile device pin generator configured to generate a mobile device pin calculated based on one or more parameters; and
    an authorization device configured to:
        receive the generated mobile device pin from the mobile communication device,
        dynamically generate an authorization device matching pin calculated based on the same one or more parameters used to dynamically generate the mobile device pin,
        determine if the dynamically generated authorization device matching pin is the same as the dynamically generated mobile device pin and, if so, pairing the mobile communication device to the authorization device, and output an access control signal if the received dynamically generated mobile device pin is the same as the dynamically generated authorization device matching pin.

9. The system of claim 8 further including a central control device including the mobile device pin generator and a communication module for wirelessly transmitting said generated mobile device pin to the mobile device.

10. The system of claim 9 in which the communication module is configured to wirelessly transmitting said generated mobile device pin to the mobile device using an SMS, interne page, e-mail message, voice message, and postal delivery.

11. The system of claim 8 in which pairing the mobile communication device to the authorization device includes Bluetooth pairing of the authorization device to the mobile communication device.

12. The system of claim 8 further including a lock unlocked by the control signal output from the authorization device.

13. The system of claim 8 in which said one or more parameters include a temporal parameter, a control parameter, a location information parameter, and/or the Bluetooth address of the mobile communication device.

* * * * *